United States Patent
Coza et al.

(10) Patent No.: US 11,484,075 B2
(45) Date of Patent: *Nov. 1, 2022

(54) MULTILAYER FABRIC WITH SELECTIVE RADIATION FILTER

(71) Applicant: adidas AG, Herzogenaurach (DE)

(72) Inventors: Aurel Coza, Portland, OR (US); Roland Günter Seydel, Lake Oswego, OR (US); Josh Robert Gordon, Portland, OR (US)

(73) Assignee: adidas AG, Herzogenaurach (DE)

( * ) Notice: Subject to any disclaimer, the term of this patent is extended or adjusted under 35 U.S.C. 154(b) by 38 days.

This patent is subject to a terminal disclaimer.

(21) Appl. No.: 16/895,384

(22) Filed: Jun. 8, 2020

(65) Prior Publication Data
US 2020/0323296 A1    Oct. 15, 2020

Related U.S. Application Data

(60) Division of application No. 15/425,802, filed on Feb. 6, 2017, now Pat. No. 10,674,778, which is a
(Continued)

(51) Int. Cl.
*A41D 31/14* (2019.01)
*C25D 7/00* (2006.01)
(Continued)

(52) U.S. Cl.
CPC ............ *A41D 31/145* (2019.02); *A41B 11/00* (2013.01); *A41D 1/04* (2013.01); *A41D 1/06* (2013.01);
(Continued)

(58) Field of Classification Search
CPC .... A41D 31/102; A41D 31/125; A41D 31/02; B32B 27/12; B32B 3/266; B32B 5/024; B32B 2255/205
See application file for complete search history.

(56) References Cited

U.S. PATENT DOCUMENTS 2,391,535 A    12/1945    Zelano
2,715,226 A    8/1955    Louis
(Continued)

FOREIGN PATENT DOCUMENTS

CN    101082179    12/2007
DE    20 2008 001 340    4/2008
(Continued)

OTHER PUBLICATIONS

Wu et al., "Fabrication and characterization of a novel polypropylene/poly(vinyl alcohol)/aluminum hybrid layered assembly for high-performance fibrous insulation", Journal of Applied Polymer Science, Aug. 21, 2008, p. 2525-2530, vol. 110.
(Continued)

*Primary Examiner* — Hai Vo
(74) *Attorney, Agent, or Firm* — Sterne, Kessler, Goldstein & Fox P.L.L.C.

(57) ABSTRACT

A multilayer fabric for selectively blocking or transmitting particular wavelengths in the electromagnetic spectrum, such solar radiation, and far infrared (FIR) radiation. The multilayer fabric may include a microporous water vapor permeable layer that selectively filters particular wavelengths depending on the size of its pores. In some embodiments, the multilayer fabric may include a nanostructured layer that selectively filters particular wavelengths.

8 Claims, 10 Drawing Sheets

Related U.S. Application Data continuation of application No. 14/708,944, filed on May 11, 2015, now Pat. No. 9,596,896.

(51) Int. Cl.

| | | |
|---|---|---|
| *A43B 1/00* | (2006.01) | |
| *B32B 15/14* | (2006.01) | |
| *B32B 15/04* | (2006.01) | |
| *B32B 3/26* | (2006.01) | |
| *B32B 5/02* | (2006.01) | |
| *B32B 27/12* | (2006.01) | |
| *A41D 31/12* | (2019.01) | |
| *A41D 31/102* | (2019.01) | |
| *A41D 31/02* | (2019.01) | |
| *A41B 11/00* | (2006.01) | |
| *A41D 1/04* | (2006.01) | |
| *A41D 1/06* | (2006.01) | |
| *A41D 3/02* | (2006.01) | |
| *A41D 19/00* | (2006.01) | |

(52) U.S. Cl.
CPC ............... *A41D 3/02* (2013.01); *A41D 19/00* (2013.01); *A41D 31/02* (2013.01); *A41D 31/102* (2019.02); *A41D 31/125* (2019.02); *A43B 1/00* (2013.01); *B32B 3/26* (2013.01); *B32B 3/266* (2013.01); *B32B 5/024* (2013.01); *B32B 15/04* (2013.01); *B32B 15/14* (2013.01); *B32B 27/12* (2013.01); *C25D 7/00* (2013.01); *A41D 2400/26* (2013.01); *A41D 2400/28* (2013.01); *B32B 2250/40* (2013.01); *B32B 2255/10* (2013.01); *B32B 2255/205* (2013.01); *B32B 2307/30* (2013.01); *B32B 2307/304* (2013.01); *B32B 2307/724* (2013.01); *B32B 2307/726* (2013.01); *B32B 2437/00* (2013.01)

(56) References Cited

U.S. PATENT DOCUMENTS

| | | | |
|---|---|---|---|
| 3,045,243 | A | 7/1962 | Lash et al. |
| 4,032,681 | A | 6/1977 | Jonnes |
| 4,569,874 | A | 2/1986 | Kuznetz |
| 4,722,099 | A | 2/1988 | Kratz |
| 5,238,618 | A | 8/1993 | Kinzer |
| 5,636,380 | A | 6/1997 | Schindler et al. |
| 5,750,242 | A | 5/1998 | Culler |
| 5,955,175 | A | 9/1999 | Culler |
| 6,286,151 | B1 | 9/2001 | Lambertz |
| 6,332,221 | B1 | 12/2001 | Gracey |
| 6,427,242 | B1 | 8/2002 | Bush et al. |
| 6,918,140 | B1 | 7/2005 | Cooper |
| 7,395,557 | B1 | 7/2008 | Ledyard |
| 7,428,772 | B2 | 9/2008 | Rock |
| 7,437,774 | B2 | 10/2008 | Baron et al. |
| 7,452,833 | B2 | 11/2008 | Russell et al. |
| 7,934,267 | B2 | 5/2011 | Nordstrom et al. |
| 8,910,313 | B2 | 12/2014 | Gordon et al. |
| 9,332,792 | B2 | 5/2016 | Harber |
| 9,596,896 | B2* | 3/2017 | Coza .................... A41D 31/102 |
| 10,674,778 | B2* | 6/2020 | Coza ........................ A43B 1/00 |
| 2005/0086721 | A1 | 4/2005 | Lambertz |
| 2005/0266228 | A1 | 12/2005 | Jain et al. |
| 2006/0179539 | A1 | 8/2006 | Harber |
| 2009/0031486 | A1 | 2/2009 | Sokolowski et al. |
| 2009/0143227 | A1 | 6/2009 | Dubrow et al. |
| 2011/0113538 | A1* | 5/2011 | von Blucher ........ B01D 39/083 2/456 |
| 2012/0135658 | A1 | 5/2012 | Stone et al. |
| 2012/0288662 | A1 | 11/2012 | Conolly |
| 2013/0212789 | A1 | 8/2013 | Conolly et al. |
| 2013/0216774 | A1 | 8/2013 | Conolly et al. |
| 2014/0036355 | A1 | 2/2014 | Scholz |
| 2014/0154593 | A1* | 6/2014 | Rojeski ............... H01M 4/8626 429/405 |
| 2014/0363625 | A1* | 12/2014 | Huang ................. A41D 31/102 428/133 |

FOREIGN PATENT DOCUMENTS

| | | |
|---|---|---|
| EP | 820379 B1 | 5/1998 |
| WO | WO 03/065833 | 8/2003 |
| WO | WO 2014/019611 A1 | 2/2014 |
| WO | WO 2014/019612 A1 | 2/2014 |
| WO | WO 2014/019613 A1 | 2/2014 |

OTHER PUBLICATIONS

Popov and Bonod, "Physics of extraordinary transmission through subwavelength hole arrays" published in "Structured Surfaces as Optical Materials" Jun. 2011, Cambridge University Press, USA, pp. 1-10.

Kessler, "Insane in the Membrane", Outside Online, Mar. 7, 2012 <http://www.outsideonline.com/1898541/insane-membrane>.

Peelen and Metselaar, "Light scattering by pores in polycrystalline materials: Transmission properties of alumina", Journal of Applied Physics, Jan. 1974, p. 216-220, 45(1).

Pabst and Hostaša, "A Closed-Form Expression Approximating the MIE Solution for the Real-In-Line Transmission of Ceramics with Spherical Inclusions or Pores", Journal Ceramics-Silikáty, 2013, p. 151-161, 57(2).

Demetriadou and Hess, "Analytic theory of optical nanoplasmonic metamaterials", Physical Review, Apr. 4, 2013.

Ballard, "adidas launches aluminium and titanium-infused Climachill jersey", cyclingnews.com, May 14, 2015 <http://www.cyclingnews.com/news/adidas-launches-aluminium-and-titanium-infused-climachill-jersey>.

Extended European Search Report issued in European Patent Application No. 16168586, dated Sep. 16, 2016, 7 pages.

W. Menz et al., "Microsystem Technology", 7.7 Examples of Applications (2001), 9 pages.

Communication Pursuant to Article 94(3) EPC issued in European Patent Application No. 16168586.2, dated Nov. 8, 2018.

* cited by examiner

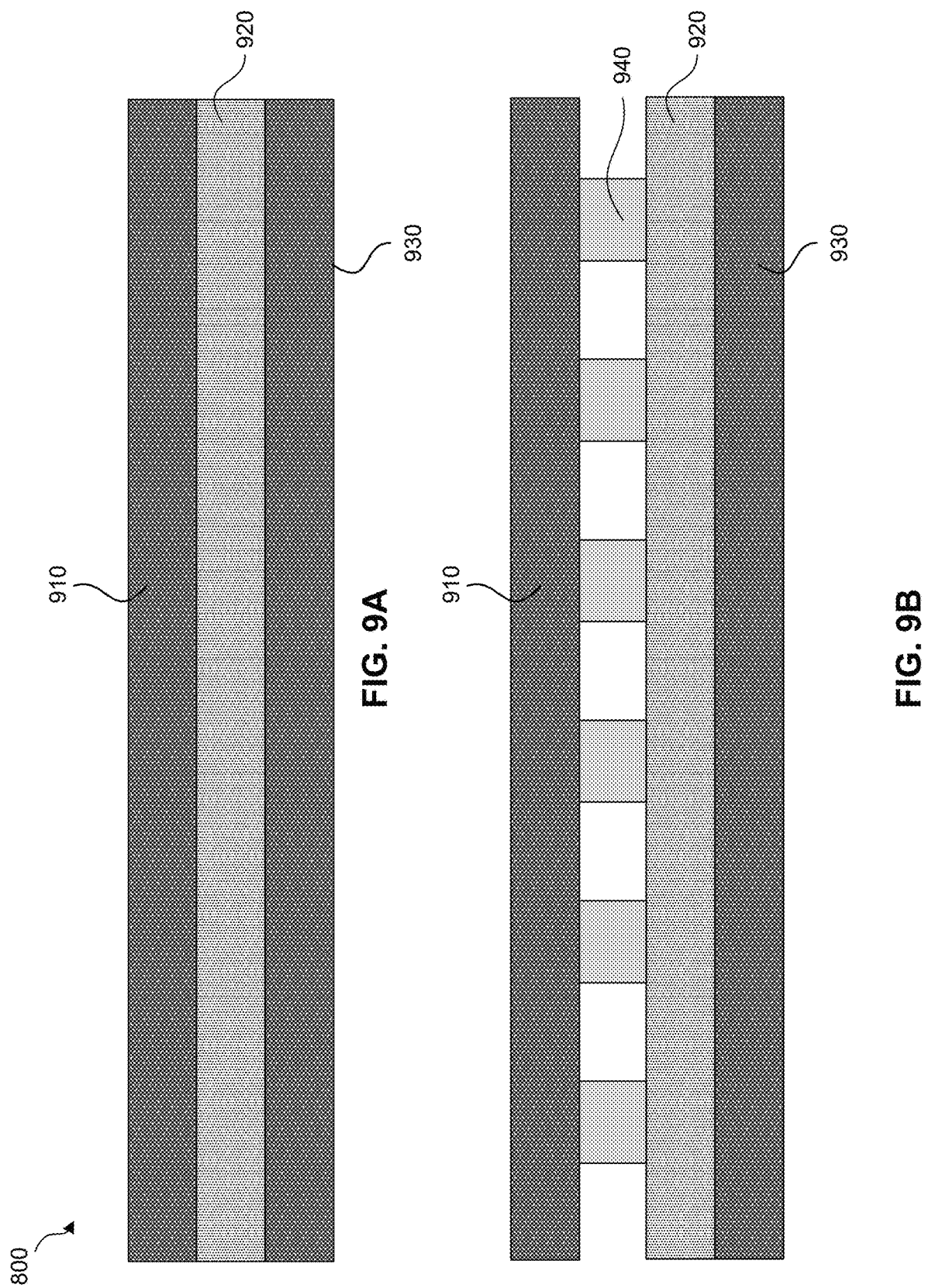

MULTILAYER FABRIC WITH SELECTIVE RADIATION FILTER

CROSS-REFERENCE TO RELATED APPLICATIONS

This application is a divisional of and claims priority to U.S. application Ser. No. 15/425,802, filed Feb. 6, 2017, which is continuation of U.S. application Ser. No. 14/708,944, filed May 11, 2015. Each of these prior-filed applications are incorporated herein by reference in their entirety.

BACKGROUND OF THE INVENTION

Field of the Invention

The present invention generally relates to a multilayer fabric. In particular, embodiments of the present invention relate to a multilayer fabric for selectively blocking or transmitting particular wavelengths in the electromagnetic spectrum, such as solar radiation (e.g., near infrared radiation (NIR)) and far infrared (FIR) radiation.

Background

Exercise, whether performed inside or outside, is important to maintaining a healthy lifestyle and individual well-being. But exercise, and in particular outdoor exercise, can be uncomfortable due to the environment surrounding an individual. Discomfort can discourage participation in athletic activities. For example, during the winter, an individual may be hesitant to participate in outdoor activities (e.g., jogging, hiking, biking) due to low temperatures. Similarly, an individual may be hesitant to participate in outdoor activities in the summer due to high temperatures. Discomfort can be exaggerated by the clothing an individual is wearing. But, discomfort can also be mediated by the clothing an individual is wearing. Clothing that keeps an individual comfortable (e.g., warm in the winter and/or cool in the summer), while also providing suitable water vapor permeability, may reduce discomfort and encourage participation in athletic activities.

Heat radiation impinging on or leaving the human body can be a source of discomfort during an athletic activity. There have been attempts to control solar and FIR radiation in garments. For example, either solar radiation reflection or far infrared (FIR) back reflection have been accomplished using continuous layers of metal or metal oxides deposited on the surface of a material. Another approach uses metal oxides or ceramic micro-particles embedded in the structure of a polymer in order to scatter and/or partially reflect FIR or solar radiation. Accordingly, effectively managing heat radiation impinging on the human body and/or leaving the human body is of interest.

BRIEF SUMMARY OF THE INVENTION

Some embodiments are directed towards a multilayer fabric including a microporous water vapor permeable layer configured to allow the transmission of far infrared (FIR) radiation and solar radiation, and a first textile layer coupled to the microporous water vapor permeable layer.

Some embodiments are directed towards a multilayer fabric including a microporous water vapor permeable layer with a pore size in the range between 1.0 microns and 14.0 microns, the microporous water vapor permeable layer being configured to allow the transmission of far infrared (FIR) radiation and solar radiation, and a first textile layer coupled to the microporous water vapor permeable layer.

Some embodiments are directed towards a multilayer fabric including a microporous water vapor permeable layer with a pore size greater than or equal to 14.0 microns, the microporous water vapor permeable layer being configured to allow the transmission of far infrared (FIR) radiation and solar radiation, and a textile layer coupled to the microporous water vapor permeable layer.

Some embodiments are directed towards an article of apparel including a multilayer fabric having a microporous water vapor permeable layer that is configured to allow the transmission of far infrared (FIR) radiation and solar radiation, and a textile layer coupled to the microporous water vapor permeable layer.

Some embodiments are directed towards a method of making a fabric including depositing a microporous water vapor permeable layer that is configured to allow the transmission of far infrared (FIR) radiation and solar radiation on a substrate layer and disposing a first textile layer over the microporous water vapor permeable layer.

BRIEF DESCRIPTION OF THE DRAWINGS/FIGURES

FIGS. 9A and 9B show cross-sectional views of multilayer fabrics according to some embodiments.

DETAILED DESCRIPTION OF THE INVENTION

Figure 1:
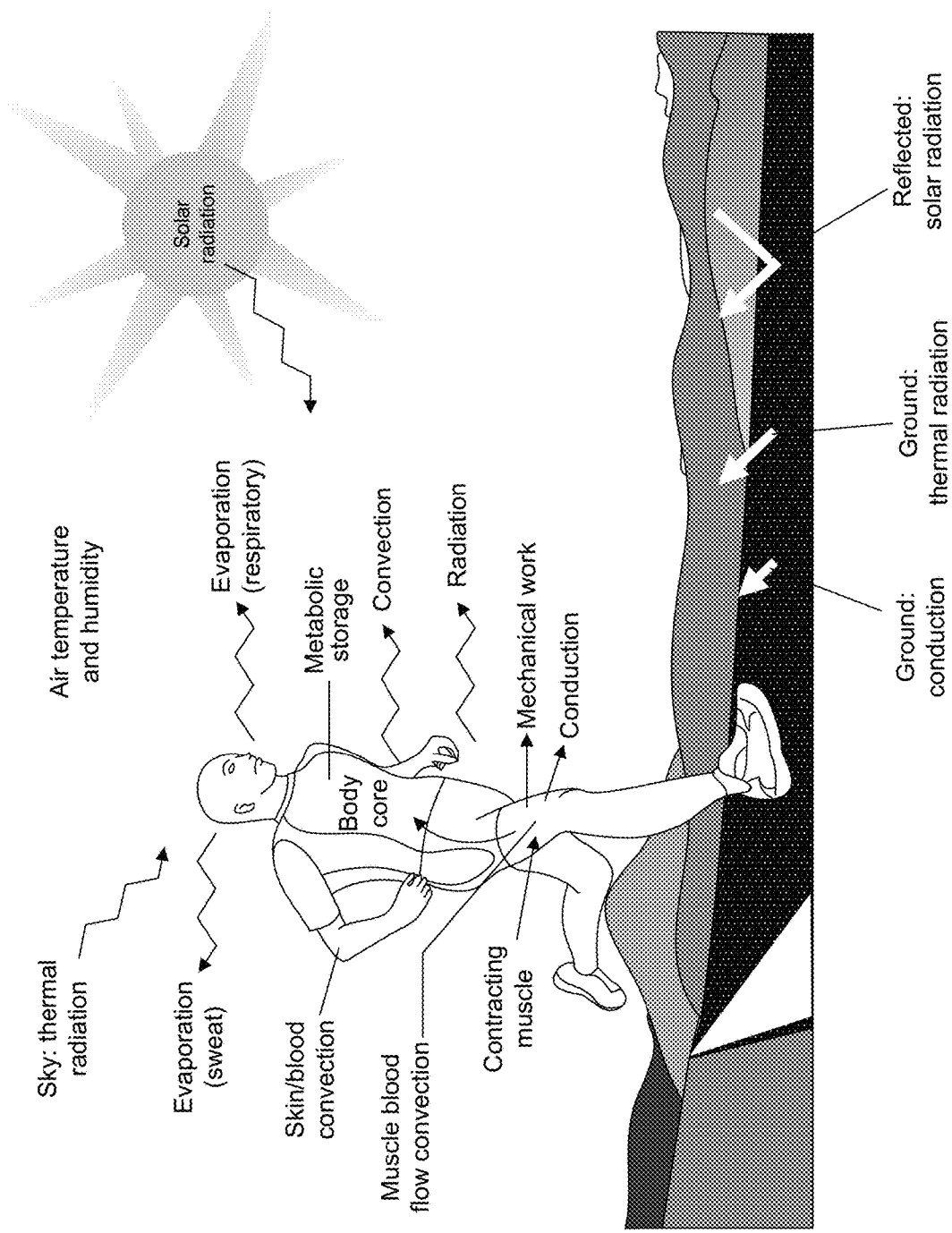
FIG. 1 is an illustration of the various heat sources the human body encounters during exercise.

The present invention will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein in the context of layers, the term "disposed on" means that a second layer is deposited, formed, or placed over a first layer. The contact between the second layer and the first layer may be indirect (i.e., there may be other layers between the first and second layer), unless it is specified that the first layer is "in contact with," "deposited on," or the like with respect to the second layer. For example, a second layer may be described as "disposed on" a first layer, even though there are various layers in between the first layer and the second layer. Furthermore, if a second layer is "disposed on" a first layer, the second layer is formed, deposited, or placed after the first layer (i.e., the first layer is present before the second layer is disposed on it).

Controlling various sources of discomfort (e.g., heat, cold, sweat, thermal radiations, etc.) can increase the comfort level for an individual participating in an outdoor or indoor activity. The apparel (i.e., clothing) worn during an activity is one way to control discomfort. In particular, the optimization of the usage and management of heat sources influencing the human body during an activity can mediate potential discomfort. For example, during cold weather months (winter) retaining heat generated by the human body and absorbing heat present in the environment surrounding the body may help keep an individual warm. In contrast, expelling heat generated by the human body and repelling heat present in the environment may help keep an individual cool during warm weather months (summer). Heat often comes in the form of radiation (e.g., solar radiation and infrared (IR) radiation). So, selectively dissipating or retaining (absorbing) certain heat radiations may help keep the body warm or cool.

While selectively dissipating or retaining certain heat radiations can mitigate discomfort, apparel should also be lightweight and breathable. Lightweight materials are desirable in most athletic scenarios because speed and quickness are valued. And breathable materials help wick sweat away from the skin and facilitate evaporation of the sweat (i.e., facilitate the natural process of sweating).

In some embodiments, a meta-material (e.g., a porous layer and/or micro-mesh) designed based on the physics of the heat transfer mechanisms of thermoregulation may be used to selectively dissipate or retain certain heat radiations. In other words, the meta-material may be capable of selectively controlling various types of radiation for optimal heat retention and/or heat dissipation. This meta-material may be incorporated into a fabric used to manufacture apparel (e.g., clothing and footwear). In particular, this meta-material may be incorporated into a fabric used to manufacture athletic apparel. In some embodiments, the meta-material may be included in a multilayer fabric used to manufacture apparel. In some embodiments, a multilayer fabric may include more than one meta-material. In some embodiments, the meta-material(s) (and the multilayer fabric) may be designed for use in warm weather conditions. In some embodiments, the meta-material(s) (and the multilayer fabric) may be designed for use in cold weather conditions. In some embodiments, the meta-material(s) (and the multilayer fabric) may be designed for year around use (i.e., in cold and warm weather conditions). The structure of the meta-material(s) may dictate selective dissipation and retention of specific heat radiations to optimize the functionality of the multilayer fabric.

Human body temperature (thermoregulation) is dictated by the balance between heat creation/absorption and heat dissipation. FIG. 1 shows an illustration of various forms of heat created by an individual and created by the environment surrounding an individual during an athletic activity. Of the various sources of heat illustrated in FIG. 1, the two main sources of heat "creation" that one should be concerned with when dealing with human body thermoregulation are metabolic (human body) heat and solar/environmental heat. As illustrated in FIG. 1, metabolic heat includes metabolic storage, muscle, blood, and skin convection, evaporation (e.g., sweat), work, and radiation leaving the body. And solar/environmental heat includes solar radiation, including solar thermal radiation, and the conduction of heat to and from the ground.

Even in the presence of all these external and internal heat influences, the human body has the remarkable capacity for regulating its core temperature somewhere between 98° F. (36.7° C.) and 100° F. (37.7° C.) when the ambient temperature is between approximately 68° F. (20° C.) and 130° F. (54.4° C.). Maintaining a body temperature at approximately 37° C. supports not only wellness of an individual but also the performance of an individual since muscles, nerves, heart, and breathing are positively supported at such a temperature. The body uses external heat transfer mechanisms (e.g., radiation, conduction, convection, and evaporation of sweat) to reduce its temperature. And the body takes a very active role in temperature regulation. The temperature of the body is regulated by neural sensory and feedback mechanisms that operate primarily through the hypothalamus.

Human thermal control can be described by the following heat balance equation:

$$M-W=E+R+C+K+S \qquad \text{(Equation 1)}$$

where: M=metabolic energy;
W=work (mechanical);
E=evaporation;
R=radiation (which is equal to the radiation that escapes the body (Re) plus the radiation absorbed by the body (Ra));
C=convection;
K=conduction; and
S=storage In cold weather conditions, if the skin's temperature drops below approximately 98.6° F. (37° C.) the body will attempt to conserve heat and/or increase heat production. The body will attempt to conserve and/or increase heat by employing one or more of the following physiological processes: vasoconstriction to decrease the flow of heat to the skin, cessation of sweating, shivering to increase heat production in the muscles, secretion of norepinephrine, epinephrine, and thyroxine to increase heat production. But, even though the body attempts to conserve and/or create heat, the body still loses heat to various mechanisms (e.g., evaporation (E), radiation (R), convention (C), conduction (K)). Of these various heat loss mechanisms, radiation escaping the body (Re) may result in the most heat loss. It should be appreciated that radiation that escapes the body (Re) must also escape any apparel worn over the body to truly escape. Otherwise, the radiation will never actually "escape" the body, but will be held in close contact with it. As such, in locations where an article of apparel is worn over the body, Re means radiation that escapes the body and any apparel worn over the body.

In warm weather conditions, the body will begin to sweat to reduce its internal temperature. The evaporation of sweat begins at a skin temperature of 98.6° F. (37° C.) and increases rapidly if the skin temperature rises above this value, while heat production of the body remains almost constant. The evaporation of sweat helps regulate the body's temperature and is the body's most effective way of doing so.

Figure 2:
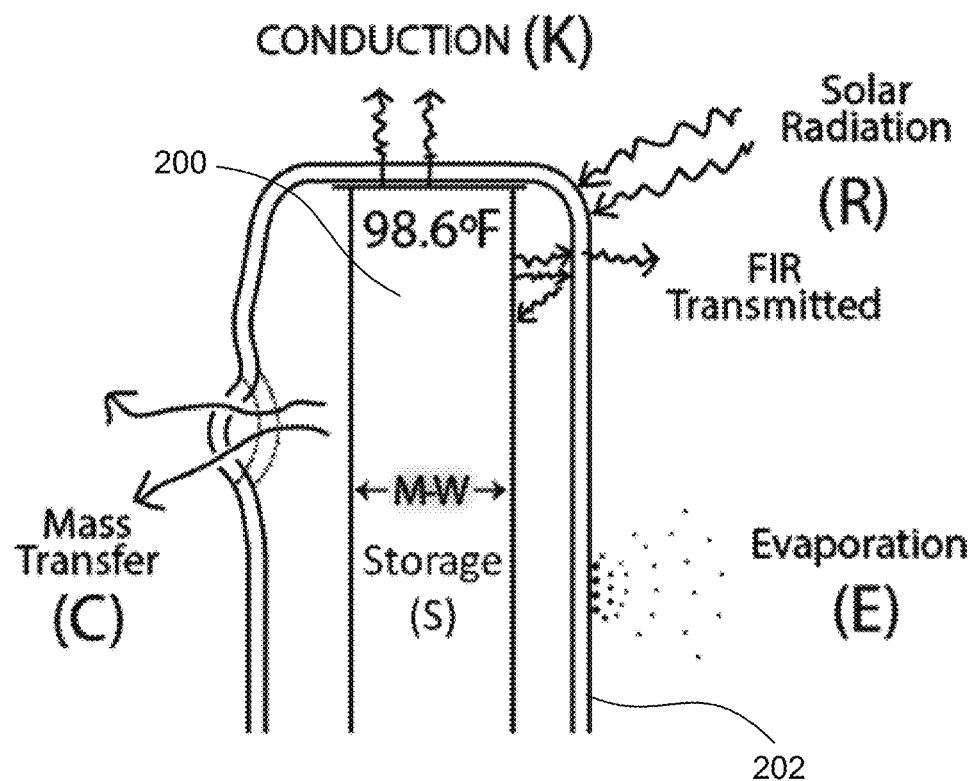
FIG. 2 is an illustration of the influence an article of apparel may have on the flow of heat to and from the human body.

When an article of apparel is worn, the apparel influences the ability of an individual's body to regulate its temperature using the above physiological mechanisms. FIG. 2 illustrates the influence an article of apparel 202 may have on some of the variables in Equation 1 for body 200. As shown in FIG. 2, apparel 202 affects the transmission/reflection of solar radiation and FIR radiation. Under certain circumstances the radiative heat balance (R) becomes the dominant variable in the right side of Equation 1. And any changes performed on this variable can dramatically alter the storage (S) term and therefore the heat loss or accumulation. Apparel also affects the conduction and convention of heat to and from body 200. Moreover, apparel 202 effects the evaporation of a liquid (e.g., sweat) in the proximity of body 200. Accordingly, an article of apparel can dictate the influence that each of these variables has on the human body.

For example, in warm weather conditions, an article of apparel may be used to facilitate the dissipation of sweat (i.e., facilitate the dissipation of heat via evaporation (E)) and/or facilitate the dissipation of radiation emitted by the body (i.e., increase the amount of radiation Re that escapes the body). As a non-limiting example, in an 82.4° F. (28° F.) environment and for a material having poor evaporative properties, the values of Equation 1 may be as follows (positive values on the right hand of equation 1 mean heat generated by the body and negative values mean heat generated by the environment): M−W=500 W, E=200 W, R=−100 W (−200 watts of solar radiation+100 watts of FIR radiation generated by the body), C=200 W, and K=50 W. Using these numbers to solve Equation 1 for S (the amount of energy stored by the body) results in S=150 W (watts). In other words, the body retains an extra 150 watts of heat at any given time. This may make an individual feel increasingly hot, uncomfortable, and eventually lead to diminished athletic performance of the individual. But, if the value of E is increased due to improved evaporative characteristics of a material, S can be reduced. For example, if E is increased to 350 W and all the other variable remain constant, solving Equation 1 for S results in S=0 watts. In other words, the body stores no extra heat, thereby preventing the individual from feeling increasingly hot and uncomfortable, and thereby helping avoid diminishing athletic performance of the individual. Similar to increasing E, optimizing the characteristics of an article of apparel may be used to increase R, thereby reducing S.

In cold weather conditions, an article of apparel may be used to create the opposite effect. For example, the characteristics of an article of apparel may be used to decrease the value of R, and specifically the value of Re, which can increase the value of S, assuming all the other variable are held constant. In cold weather conditions, where the conduction of heat away from the body is high (due to cold temperatures S can be less than 0), decreasing R while keeping all the other variables constant will increase the value of S (e.g., to 0). This helps keep an individual warm.

Figure 3:
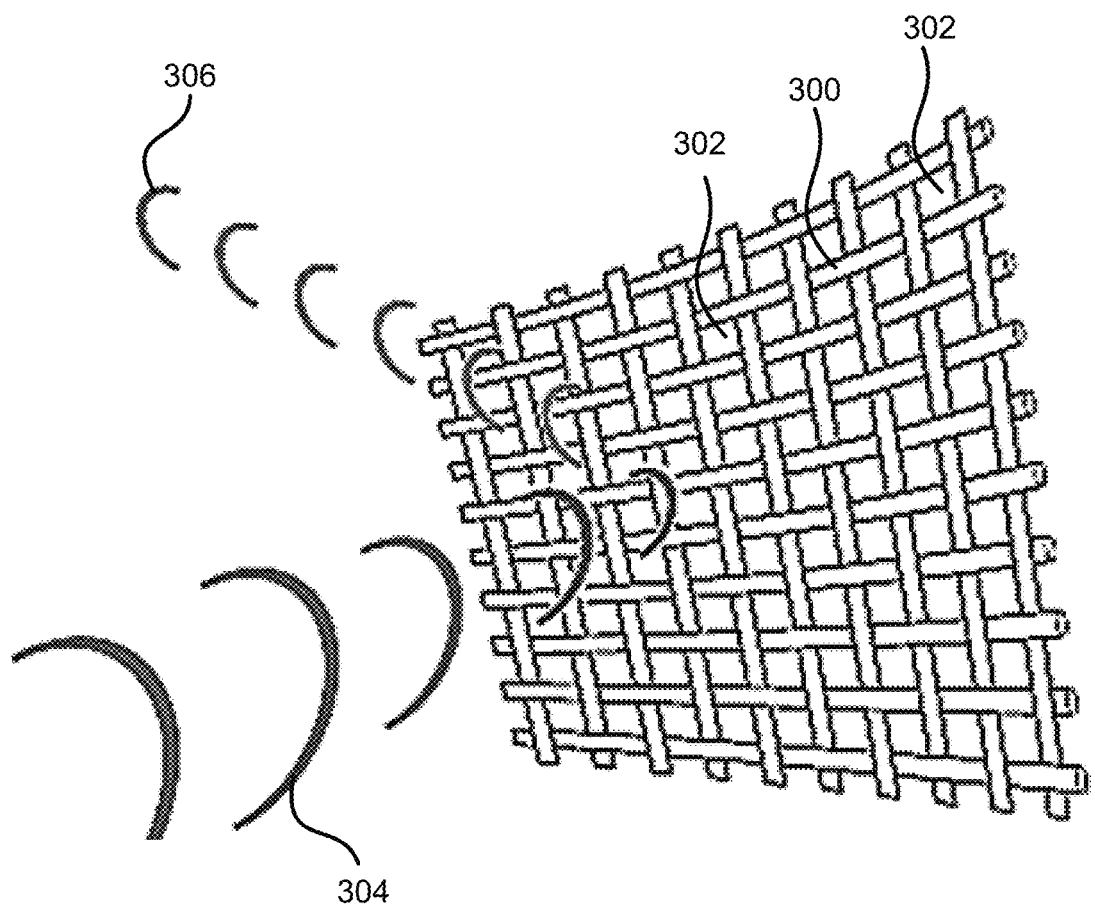
FIG. 3 is an illustration of electromagnetic filtration through a porous material.

Selective radiation filters may be used to manage the radiative heat balance (R) by selectively passing and/or blocking certain radiations. FIG. 3 illustrates the concept of selective radiation filtering for a porous material. FIG. 3 shows a material 300 having a plurality of pores 302. Depending on the size and/or spacing of pores 302, incident electromagnetic (EM) radiation 304 (e.g., IR radiation) will be in whole or part reflected. The reflected EM radiation is shown as 306 in FIG. 3. Any radiation that is not reflected will be transmitted through material 300. The wavelength of incident EM radiation 304, porosity (e.g., pore size and configuration) of material 300, and the material properties of material 300 are some of the variables that dictate the amount of radiation that is reflected and transmitted.

A selective radiation filter can be used to optimize the usage and management of the two main sources of heat "creation" for the human body (metabolic (human body) heat and solar/environmental heat) by selectively dissipating or retaining (absorbing) certain radiations in order to keep the body warm or cool. The selective radiation filter utilizes the quantum interaction between the electromagnetic radiation (e.g., UV light, visible light, and infrared radiation) and a structured material. Thus, a mesh or porous material of a certain grid interspacing (e.g., porosity) can be perfectly transparent for radiation below a certain wavelength and perfectly opaque/reflective for frequencies above that given wavelength. These phenomena can be used to selectively control the transmission and reflection of body heat and solar/environmental radiation to maximize the usage and management of available radiation.

The transmission of a certain wavelength through a porous material can be expressed using the following equation:

$$T=[(D/2)/\lambda]^4 \quad \text{(Equation 2)}$$

where: T=transmission coeff. (% of the incident EM radiation that passes through the porous material);
D=diameter of the pore
λ=the wavelength of the incident EM radiation Equation 2 is a form of the Rayleigh scattering equation and models the Rayleigh scattering of incident EM when the scattering centers are much smaller than the wavelength of the incident EM. Rayleigh scattering increases rapidly at short wavelengths. Two other types of scattering may also influence the transmission of certain wavelengths through a porous material—Mie scattering and reflection/transmission. Both Mie scattering and reflection/transmission are dependent on the pore size of the porous material. When a scattering center is much larger than the wavelength of the incident EM, there is almost no scattering of incident EM radiation, so the incident EM radiation transmits through the porous material. Mie scattering occurs when the size of scattering centers in comparable to the wavelength of the incident EM radiation.

Rayleigh scattering may also be modeled using the following equations:

$$\alpha_{Rayleigh} = \frac{4\phi\pi^4 n_m d^3}{\lambda_0^4}\left(\frac{m^2-1}{m^2+2}\right)^2 \quad \text{(Equation 3)}$$

$$\alpha_{RDG\,(large\,sphere)} = \frac{3\phi\pi^2 \Delta n^2 d}{\lambda_0^2} \quad \text{(Equation 4)}$$

$$\alpha_{RDG\,(small\,sphere)} = \frac{16\phi\pi^4 \Delta n^2 n_m^2 d^3}{9\lambda_0^4} \quad \text{(Equation 5)}$$

where: $\alpha_{Rayleigh}$=the Rayleigh scattering coefficient;
$\alpha_{RDG\,(small\,sphere)}$=the Rayleigh-Gans-Debye scattering coefficient for small size spheres;
$\alpha_{RDG\,(large\,sphere)}$=the Rayleigh-Gans-Debye scattering coefficient for large size spheres;
φ=volume fraction of inclusions or pores per unit of volume (N)

$$\phi = N \cdot V_i$$

Vi is the volume of a single inclusion or pore
n=refractive index;
$n_m$=maximum refractive index;

m=relative refractive index (m=$n_{pore}/n_{substrate}$);
d=diameter of the inclusion or pore; and
$\lambda_0$=wavelength of the incident radiation Reflection and Transmission can be modeled using the following equation:

$$\alpha_{Fraunhofer} = \frac{3\phi}{d} \quad \text{(Equation 6)}$$

$\alpha_{Fraunhofer}$=the Fraunhofer (or geometric optics) scattering coefficient;

$\phi$=volume fraction of inclusions or pores per unit of volume (N); and d=diameter of the inclusion or pore Mie scattering can be modeled using the following equations:

$$T = (1-R)^2 \exp(-C_{sca}t) \quad \text{(Equation 7)}$$

$$R = (m_2 - 1)^2 / (m_2 + 1)^2 \quad \text{(Equation 8)}$$

$$m_2 = \left( 1 + \frac{1.023798\lambda_0^2}{\lambda_0^2 - 0.00377588} + \frac{1.058264\lambda_0^2}{\lambda_0^2 + 0.0122544} + \frac{5.280792\lambda_0^2}{\lambda_0^2 - 321.3616} \right)^{1/2} \quad \text{(Equation 9)}$$

where: T=the transmission coefficient for Mie scattering;
R=Reflectivity;
$C_{sca}$=coefficient of scattering;
t=sphere size parameter;
m=diffraction index (material dependent); and
$\lambda_0$=incident radiation wavelength.

Accordingly, by carefully selecting a material (e.g., a metallic material) and the pore size of that material, a porous material may be used as a selective radiation filter for specific wavelengths in the EM spectrum. As such, the variable R can be controlled by carefully selecting the pore size of a material. In particular, the radiation that escapes the human body (Re) and the radiation absorbed by the human body (Ra) can be controlled by carefully selecting the pore size of a material.

Figure 4C:
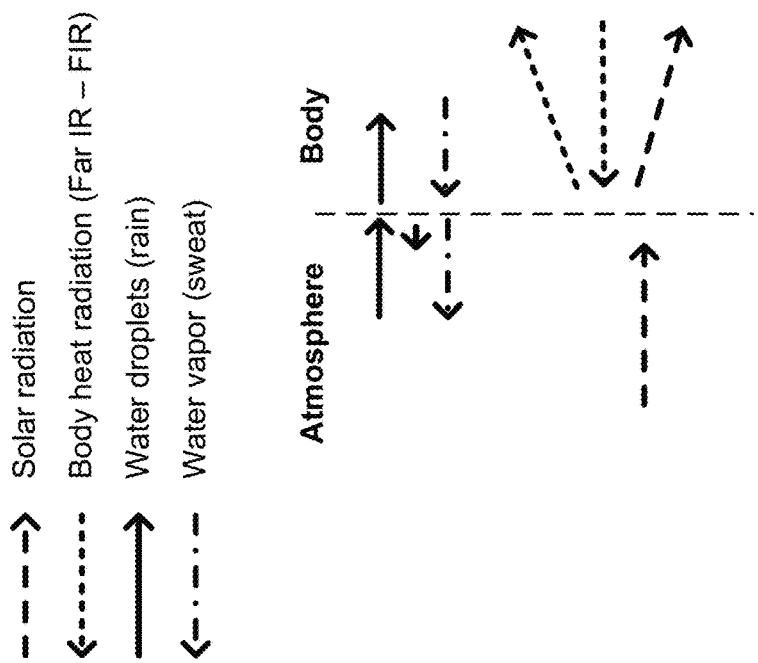
FIGS. 4A-4C illustrate the transmission or reflection of radiation and the water or water vapor permeability for various metal layers having different porosity.
Figure 4B:
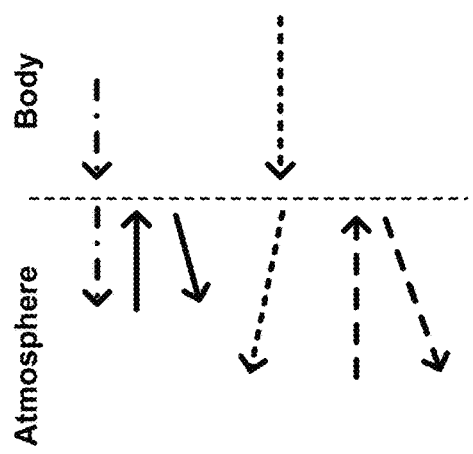
Figure 4A:
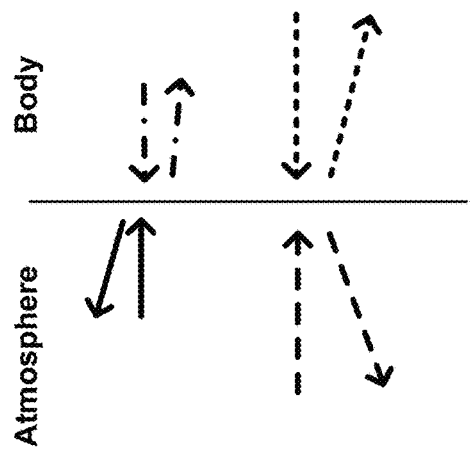

In some embodiments, a microporous layer may be used as a selective radiation filter. Preferably, the microporous layer is also water vapor permeable to facilitate the wicking and evaporation of sweat. FIGS. 4A-C illustrate the transmission or reflection of solar radiation (e.g., UV and visible light, and near infrared radiation (NIR)) and far infrared (FIR) radiation (e.g., wavelengths between 8 microns and 12 microns) for various metal layers. While FIGS. 4A-4C depict and describe the transmission of solar radiation and FIR radiation for different metallic layers, other porous layers comprising non-metallic layers (e.g., metal oxides or carbon based layers) may also selectively filter solar and/or FIR radiation. The specific wavelengths filtered (and the amount of each wavelength filtered) may depend on the material and porosity (e.g., pore size) of the layer. FIG. 4A shows the transmission or reflection of solar radiation and FIR radiation for a continuous (i.e., non-porous) layer of metal. FIG. 4B shows the transmission or reflection of solar radiation and FIR radiation for a porous metal layer having a pore size in the range of approximately 1 micron to 2 microns. FIG. 4C shows the transmission or reflection of solar radiation and FIR radiation for a porous metal layer having a pore size in the range of approximately 9 microns to 14 microns. FIGS. 4A-C also show water and water vapor permeability for the continuous and porous metal layers.

As shown in FIG. 4A, a continuous metal layer blocks (reflects) water, water vapor, solar radiation, and FIR radiation due to a lack of porosity. Electromagnetic radiation (e.g., IR, UV, and visible) will be completely reflected by a metal layer at least 3 atoms thick, but once porosity is introduced to the metal layer, it may begin to allow transmission of water, water vapor, solar radiation, and/or FIR radiation. As shown in FIG. 4B, a porous metal layer having a pore size of in the range of approximately 1 micron to 2 microns starts becoming water vapor permeable, but continues to block water. Additionally, a pore size of approximately 1-2 microns or less pore size continues to reflect most solar radiation. But, a pore size of approximately 1-2 microns will transmit FIR radiation, and in particular FIR radiation having a wavelength in the range of 8 microns to 12 microns. However, as shown in FIG. 4C, if the pore size is increased to approximately 9-14 microns, the porous metal layer begins to transmit large amounts of solar radiation (an in particular solar radiation in the range of 0.4 microns to 2.2 microns and block large amounts of FIR radiation. In addition to transmitting solar and FIR radiation, a pore size in the range of approximately 9-14 microns is more permeable to water vapor and may also be slightly water permeable, compared to a pore size of approximately 1-2 microns.

As illustrated in FIGS. 4B and 4C, a pore size in between approximately 1 micron and 14 microns will transmit and reflect various amounts of solar and FIR radiation. Accordingly, the amount of solar and/or FIR radiation transmitted through a layer can be controlled by changing the pore size of a material within the range between approximately 1 micron and 14 microns. Moreover, the water/water vapor permeability of a layer can be controlled by varying the pore size in the range between approximately 1 micron and 14 microns.

In some embodiments, a nanostructured layer and/or another meta-material layer may be used, alone or in combination with a microporous layer, to optimize the usage and management of metabolic (human body) heat and solar/environmental heat. Suitable meta-material layers include, but are not limited to microporous layers, nanostructured layers, wire meshes, loop meta-materials, spiral meta-materials, metal oxide cracks, and a combination thereof. For example, a first meta-material layer may be configured to selectively filter radiation in the FIR spectrum while a second meta-material layer may be configured to selectively filter solar radiation (e.g., block solar radiation).

In some embodiments, a meta-material layer may include dispersed particles for selectively filtering specific wavelengths within the EM spectrum. In some embodiments, the particles may be spherical particles. The size of the particles may be the same as or substantially the same as any of the pore sizes discussed herein. Particles may be made of, for example, but not limited to, one or more metallic materials, metal oxide materials, carbon-based materials, ceramics, and any combination thereof. The size and distribution of particles may dictate the selective filtering characteristics of a layer including dispersed particles.

Figure 5A:
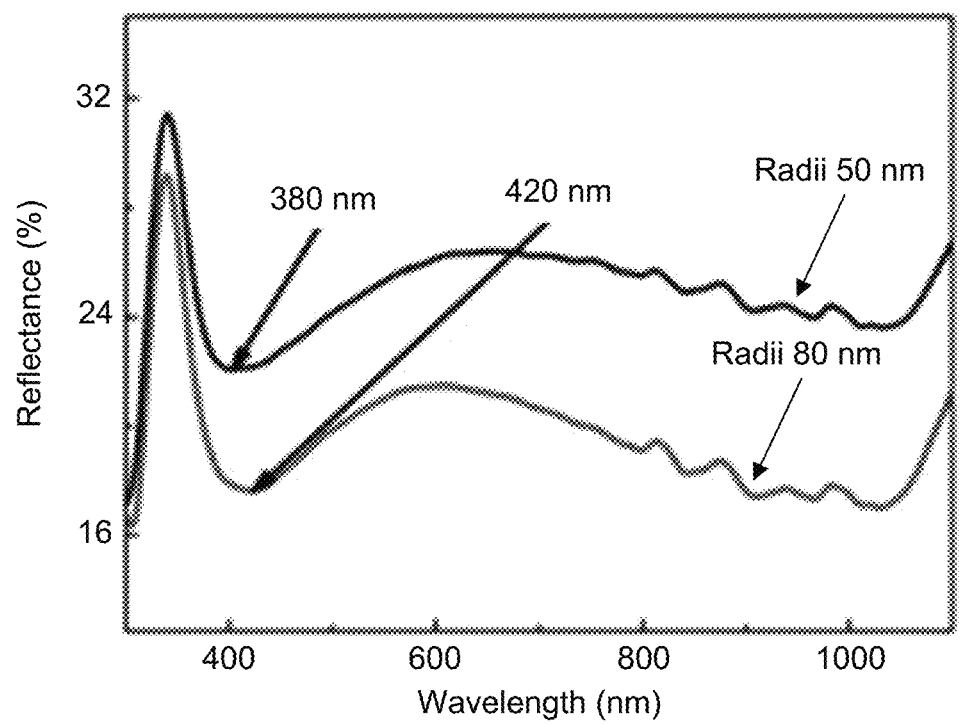
FIGS. 5A and 5B are graphs of wavelength versus percent reflectance for materials containing nanoparticles having different radii.
Figure 5B:
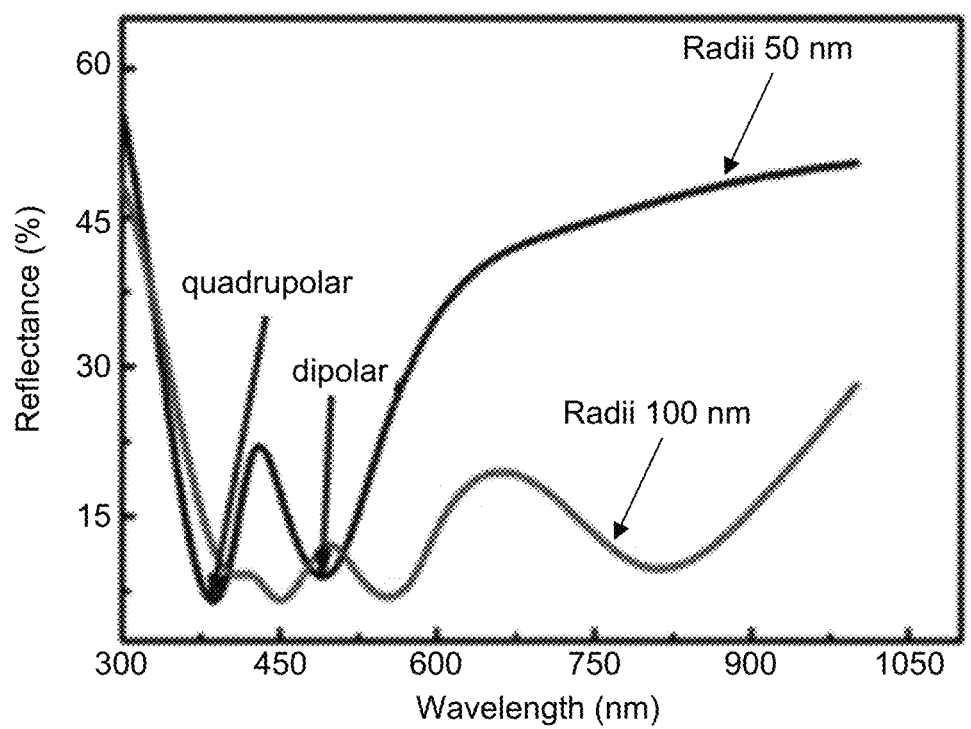

As used herein, the term "nanostructured layer" means a layer of material with at least one nanosized feature having at least one dimension measured in nanometers. Nanosized features include, but are not limited to, nanopores, nanoparticles, nanospheres, nanograins, nanorods, nanoplatelets, and nanosized surface features, such as nanoridges or nanogrooves. The nanosized feature may include at least one dimension in the range of 1 to 500 nanometers in size. In some embodiments, the nanosized feature may include at least one dimension in the range of 50 to 200 nanometers in size. Similar to a microporous layer, a nanostructured layer can be tailored to transmit and reflect certain wavelengths. The backscattering (reflection) and forward scattering (transmission) for a nanostructured layer including nanoparticles can be expressed using the following equations:

$$Q_{BS} = \frac{1}{q^2} \left| \sum_{l=1}^{\infty} (2l+1)(-1)^l [a_l - b_l] \right|^2 \quad \text{(Equation 10)}$$

$$Q_{FS} = \frac{1}{q^2} \left| \sum_{l=1}^{\infty} (2l+1) \lceil a_l + b_l \rceil \right|^2 \quad \text{(Equation 11)}$$

where: $Q_{BS}$=percent backward scattering;
$Q_{FS}$=percent forward scattering;
q=size parameter—relating to the actual size and the dielectric properties of the particle;
l=a constant factor (integer between 1 and 3) that quantifies the trajectory taken by the light in the vicinity of the particle;
a=electrical scattering amplitudes;
b=magnetic scattering amplitudes;

FIGS. 5A and 5B illustrate the percent reflectance (percent backward scattering) for two different materials having different nanoparticle sizes across a range of wavelengths. As illustrated in both FIGS. 5A and 5B, the percent backscattering for a specific nanoparticle size and composition is dependent on the wavelength of the incident radiation (e.g., light). The percent backscattering may be affected by one or more of the particle size, the particle density, the substrate material for the nanostructured layer, the particle material, and the wavelength of the incident radiation. Typically, wavelengths comparable to the radii of the nanoparticles will be reflected. Accordingly, by carefully selecting the size and distribution of nanoparticles within a material, specific wavelengths within the EM spectrum can be selectively transmitted or reflected. The size and shape of other types of nanostructured features (e.g., nanopores, nanograins, nanorods, etc.) associated with a nanostructured layers can also be carefully selected to selectively transit or reflect specific wavelengths within the EM spectrum. In some embodiments, a nanostructured layer may comprise a nanoplasmonic material.

Figure 6:
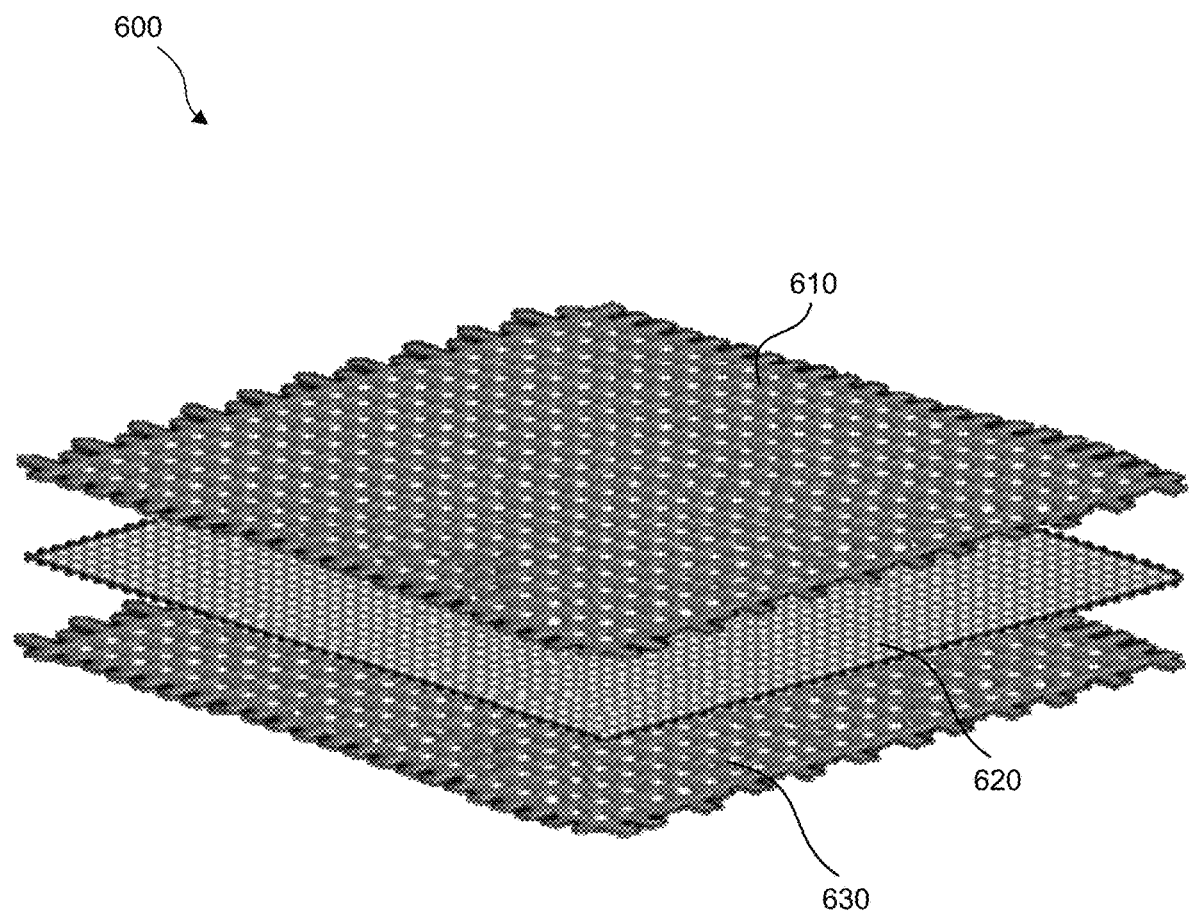
FIG. 6 shows an exploded view of a multilayer fabric according to an embodiment.

FIG. 6 shows an exploded view of a multilayer fabric 600 according to an embodiment. Multilayer fabric 600 may include a first textile layer 610, a second textile layer 630, and a microporous water vapor permeable layer 620 disposed between and coupled to first textile layer 610 and second textile layer 630. Microporous water vapor permeable layer 620 may be configured to allow the transmission of FIR radiation and solar radiation. In some embodiments, microporous water vapor permeable layer 620 may be configured to allow the transmission of FIR radiation in the long wavelength infrared wavelength spectrum (i.e., 8-15 microns). In some embodiments, microporous water vapor permeable layer 620 may be configured to allow the transmission of FIR radiation having wavelengths in the range of 8 microns to 12 microns. In some embodiments, microporous water vapor permeable layer 620 may be configured to allow the transmission of solar radiation having wavelengths in the range 0.4 microns to 2.2 microns.

In some embodiments, microporous water vapor permeable layer 620 may be disposed on first textile layer 610. In some embodiments, microporous water vapor permeable layer 620 may be in contact with first textile layer 610. In some embodiments, microporous water vapor permeable layer 620 may be disposed on second textile layer 630. In some embodiments, microporous water vapor permeable layer 620 may be in contact with second textile layer 630.

First textile layer 610 and second textile layer 630 may be woven, nonwoven or knitted and may be made of one or more suitable textile materials (i.e., fabric material) including, but not limited to, nylon, polyester, polyamide, polyolefin, acrylic, expanded polytetrafluoroethylene (ePTFE), cotton, silk, any combination, blend, or recycled version of the same. Preferably, the textile material of first and second textile layers 610/630 is water vapor permeable.

First textile layer 610 and second textile layer 630 protect microporous water vapor permeable layer 620 from damage (e.g., water, abrasion, puncturing, etc.). In some embodiments, multilayer fabric may include more than one first textile layer 610. In some embodiments, multilayer fabric may include more than one second textile layer 630. In some embodiments, first textile layer(s) 610 and second textile layer(s) 630 may be composed of the same, or substantially the same, material(s). In some embodiments, first textile layer(s) 610 and second textile layer(s) 630 may be composed of different materials.

Microporous water vapor permeable layer 620 may include a metallic material, such as, but not limited to, aluminum, titanium, silver, copper, gold, zinc, cobalt, nickel, platinum, or any combination or alloy thereof. In some embodiments, microporous water vapor permeable layer 620 may include a microporous membrane coated with a metallic material. In some embodiments, the microporous membrane may be composed of a polymeric material, such as but not limited to porous polyethylene (PE), porous polypropylene (PP), porous polyvinylidene fluoride (PVDF), polyurethane (PU—hydrophilic monolithic), polyurethane (PU—hydrophobic microporous) and porous expanded polytetrafluoroethylene (ePTFE).

In some embodiments, microporous water vapor permeable layer 620 may include a porous metal oxide array (e.g., aluminum oxide or titanium oxide array) or a porous carbon based array (e.g., a grapheme array). In some embodiments, microporous water vapor permeable layer 620 may include a doped membrane. In some embodiments, the membrane may be composed of one or more polymeric materials, metallic materials, and/or ceramic materials. The membrane may be doped with a material configured to reflect incident EM radiation, such as but not limited to, a metallic material, a ceramic material, and a carbon-based material. In some embodiments, microporous water vapor permeable layer 620 may include a metal/polymer composite membrane, such as but not limited to, a metal/polymer composite membrane used in manufacturing DVD or Blu-ray™ discs. In some embodiments, a polymer substrate may be extruded and formed into a mesh/porous layer to create the appropriate pore dimensions. In some embodiments, microporous water vapor permeable layer 620 may be composed of only (i.e., consist of) a metallic material, such as, but not limited to, aluminum, titanium, silver, copper, gold, zinc, cobalt, nickel, platinum, and any combination or alloy thereof.

In some embodiments, multilayer fabric 600 may include more than one microporous water vapor permeable layer 620. In some embodiments, different microporous water vapor permeable layers may be configured to selectively block and/or transmit different wavelengths of EM radiation. In some embodiments, different zones/areas on a single microporous water vapor permeable layer may collectively filter a desired set or sets of wavelengths. In some embodiments, microporous water vapor permeable layer 620 may include at least some open micropores that extend through microporous water vapor permeable layer 620 to provide water vapor permeability. In some embodiments, 100% of the micropores of layer 620 are open pores that extend through layer 620. In some embodiments, at least 90% of the micropores of layer 620 may extend through layer 620.

Microporous water vapor preamble layer 620 may include a porosity (i.e., pore size and distribution) configured to transmit or reflect a predefined set of wavelengths in the FIR and solar radiation spectrums. In other words, microporous water vapor permeable layer 620 may be a selective radiation filter configured to transmit or reflect a predefined set of wavelengths in the FIR and solar radiation spectrums. The porosity and the predefined set(s) of wavelengths in the FIR and solar radiation spectrums may be selected as discussed herein. In some embodiments, microporous water vapor permeable layer 620 may include substantially spherically shaped pores. In some embodiments, water vapor permeable layer 620 may include non-spherically shaped pores, for example, but not limited to, square pores, rectangular pores, and hexagonal pores. Microporous water vapor permeable layer 620 may have any of the porosities (e.g., pore size and distribution) as discussed herein.

Figure 7A:
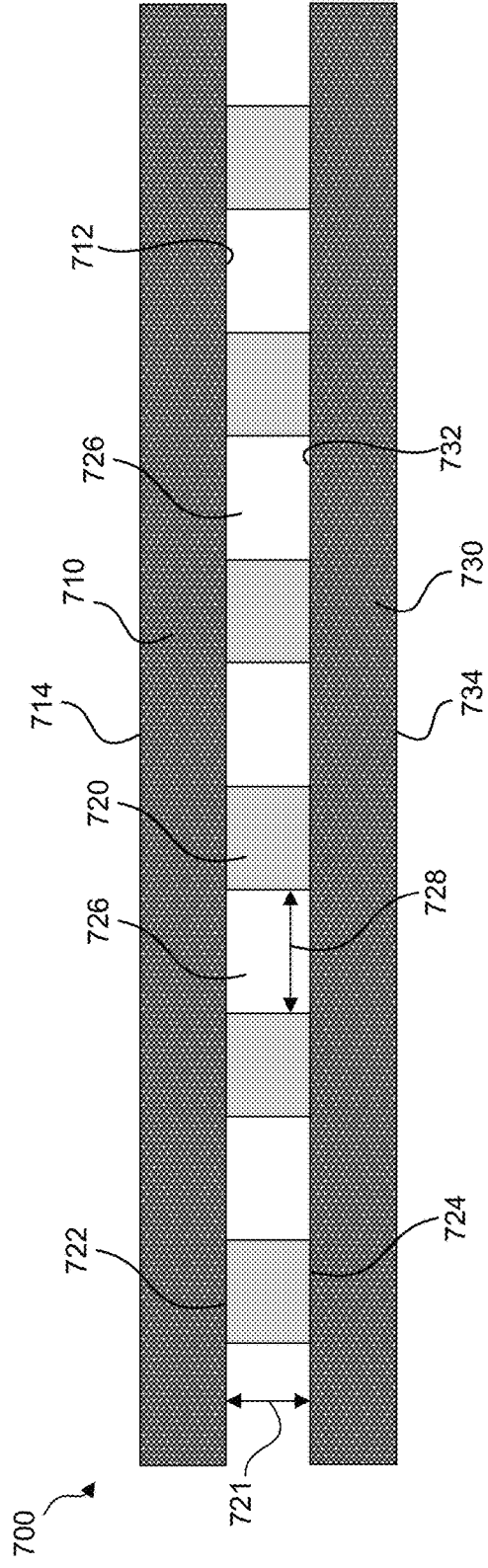
FIGS. 7A and 7B show cross-sectional views of multilayer fabrics according to some embodiments.

FIG. 7A shows a cross-sectional view of a multilayer fabric 700 according to an embodiment. Multilayer fabric 700 may include a first textile layer 710, a second textile layer 730, and a microporous water vapor permeable layer 720 disposed between and coupled to first textile layer 710 and second textile layer 730. First textile layer 710 and second textile layer 730 may be the same as or similar to first textile layer 610 and second textile layer 630, respectively. Microporous water vapor permeable layer 720 may be composed of a single metallic material (e.g., a pure metallic material or a metallic alloy), such but not limited to aluminum, titanium, silver, copper, gold, zinc, cobalt, nickel, platinum, and any combination or alloy thereof.

As shown in FIG. 7, first textile layer 710 includes an inner surface 712 and an outer surface 714. Similarly, second textile layer 730 includes an inner surface 732 and an outer surface 734. In some embodiments, microporous water vapor permeable layer 720 may be disposed on inner surface 712. In some embodiments, microporous water vapor permeable layer 720 may be in contact with inner surface 712. In some embodiments, microporous water vapor permeable layer 720 may be disposed on inner surface 732. In some embodiments, microporous water vapor permeable layer 720 may be in contact with inner surface 732. Microporous water vapor permeable layer 720 may be deposited on first textile layer 710 second textile layer 730, or any other layer discussed herein, using a process such as, but not limited to, vapor deposition (chemical or physical) and electrochemical deposition. In some embodiments, a continuous (i.e., non-porous) metallic layer may be deposited and pores may be formed using, for example, laser perforation. When multilayer fabric 700 is assembled, microporous water vapor permeable layer 720 may be disposed between inner surface 712 of first textile layer 710 and inner surface 732 of second textile layer.

Microporous water vapor permeable layer 720 includes a first exterior surface 722 and a second exterior surface 724, which define a thickness 721 of microporous water vapor permeable layer 720. Thickness 721 is at least 3 atoms thick. For example, if microporous water vapor permeable layer 720 is composed of aluminum, thickness 721 is at least 6 times the atomic radius of aluminum. In some embodiments, thickness 721 may be in the range of 7.5 angstroms to 10 microns. In some embodiments, thickness 721 may be 10 nm or less. In some embodiments having a water vapor permeable layer 720 including a doped membrane, thickness 721 may be in the range of 100 microns to 500 microns.

FIG. 7A also shows pores 726 of microporous water vapor permeable layer 720 having a pore diameter 728. Pores 726 may be open pores that extend through microporous water vapor permeable layer 720 (i.e., extend from first exterior surface 722 to second exterior surface 724). In some embodiments, pore diameter 728 may be in the range of 1.0 micron to 14.0 microns. In some embodiments, pore diameter 728 may in the range of 1.0 microns to 2.0 microns. In some embodiments, pore diameter 728 may in the range of 2.0 microns to 14.0 microns. In some embodiments, pore diameter 728 may in the range of 2.0 microns to 8.0 microns. In some embodiments, pore diameter 728 may in the range of 9.0 microns to 14.0 microns. In some embodiments, pore diameter 728 may be greater than 14.0 microns. Pore diameter 728 may be selected based on the desired functionality of multilayer fabric 700. For example, a pore size in the range of 1.0-2.0 microns may be selected for a multilayer fabric intended to be used in warm weather. Such a pore diameter may facilitate the transmission of FIR radiation away from an individual's body, thereby helping keep the body cool.

In some embodiments, the average pore diameter 728 of microporous water vapor permeable layer 720 may be in the range of 1.0 micron to 14.0 microns. In some embodiments, the average pore diameter 728 of microporous water vapor permeable layer 720 may be in the range of 1.0 micron to 2.0 microns. In some embodiments, the average pore diameter 728 of microporous water vapor permeable layer 720 may be in the range of 2.0 microns to 14.0 microns. In some embodiments, the average pore diameter 728 of microporous water vapor permeable layer 720 may be in the range of 2 microns to 8.0 microns. In some embodiments, the average pore diameter 728 of microporous water vapor permeable layer 720 may be in the range of 9.0 micron to 14.0 microns. In some embodiments, the average pore diameter 728 of microporous water vapor permeable layer 720 may be greater than 14.0 microns. The average pore diameter 728 may be selected based on the desired functionality of multilayer fabric 700.

In some embodiments, the pore diameter 728 of each pore 726 is consistent throughout microporous water vapor permeable layer 720 or in a zone/area of microporous water vapor permeable layer 720. In some embodiments, the deviation in pore diameter 728 of microporous water vapor permeable layer 720, or zone/area of microporous water vapor permeable layer 720, is no greater than a predetermined value. In some embodiments, the predetermined value is +/−1.0 microns or less. In some embodiments, the predetermined value is +/−0.5 microns or less. Reducing the deviation in pore diameter may improve the selective filtering capabilities of the entire microporous layer or a specific zone/area of the layer. Since pore size dictates which wavelengths of radiation (and the amounts of each wavelength) are transmitted and reflected, a small pore size deviation aids in ensuring that only desired wavelengths (and amounts) are transmitted, while others are reflected. In some embodiments, microporous water vapor permeable layer 720, or one or more areas/zones of microporous water vapor permeable layer 720, may have a specific deviation in pore size and/or distribution. A deviation in pore size (e.g., in different areas or zones of a porous material) may facilitate selective filtering of different wavelengths at different locations on microporous water vapor permeable layer 720.

In some embodiments, the pore size and/or average pore size of pores 726 is selected so that microporous water vapor permeable layer 720 allows the transmission of no more than 10% of FIR radiation having wavelengths in the range of 8 microns to 12 microns. In some embodiments, the pore size and/or pore size of pores 726 is selected so that microporous water vapor permeable layer 720 allows the transmission of no more than 5% of FIR radiation having wavelengths in the range of 8 microns to 12 microns. In some embodiments, the pore size and/or average pore size of pores 726 is selected so that microporous water vapor permeable layer 720 allows the transmission of no more than 1% of FIR radiation having wavelengths in the range of 8 microns to 12 microns. In each of these embodiments, limiting the transmission of FIR radiation may prevent FIR radiation from escaping the human body (i.e., decrease the value of R, and specifically the value of Re). As discussed above, this may help keep an individual warm while participating in cold weather activities.

In some embodiments, the pore size and/or average pore size of pores 726 is selected so that microporous water vapor permeable layer 720 allows the transmission of no less than 90% of solar radiation having wavelengths in the range of 0.4 microns to 2.2 microns. In some embodiments, the pore size and/or average pore size of pores 726 is selected to that microporous water vapor permeable layer 720 allows the transmission of no less than 95% of solar radiation having wavelengths in the range of 0.4 microns to 2.2 microns. In each of these embodiments, allowing the transmission of solar radiation increases the amount of solar radiation incident on the human body (i.e., decreases the value of R by increasing the absolute value of Ra (Ra is a negative value in Equation 1 because it is heat generated by the environment)). As discussed above, this may help keep an individual warm while participating in cold weather activities.

In some embodiments, the pore size and/or average pore size of pores 726 is selected so that microporous water vapor permeable layer 720 allows the transmission of 100% of FIR radiation having wavelengths in the range of 8 microns to 12 microns. Allowing the transmission of 100% of FIR radiation allows FIR radiation to escape the human body (i.e., increases the value of R, and specifically the value of Re). As discussed above, this may help keep an individual cool while participating in warm weather outdoor activity.

In some embodiments, pores 726 of microporous water vapor permeable layer 720 may be arranged in a repeated pattern. The repeated pattern may be consistent throughout water vapor permeable layer 720 or may be confined to a specific zone/area of microporous water vapor permeable layer 720. In other words, the pore diameter 728 and distribution of pores 726 (i.e., porosity) may be constant throughout layer 720 or in one or more specific zones/areas of microporous water vapor permeable layer 720. In some embodiments, microporous water vapor permeable layer 720 may include a plurality of different zones/areas having pores of a specific size arranged in a repeated pattern. A consistent and repeated porosity may improve the selective filtering capabilities of layer 720 and/or a zone/area of layer 720. In some embodiments, the pore density of microporous water vapor permeable layer 720, or a zone/area microporous water vapor permeable layer 720, may be at least 5,000 pores per $mm^2$. In some embodiments, the pore density of microporous water vapor permeable layer 720, or a zone/area microporous water vapor permeable layer 720, may be in the range between 6,000 pores per $mm^2$ to 9,000 pores per $mm^2$. In some embodiments, the pore density of microporous water vapor permeable layer 720, or a zone/area microporous water vapor permeable layer 720, may be in the range between 7,000 pores per $mm^2$ to 8,000 pores per $mm^2$.

Figure 7B:
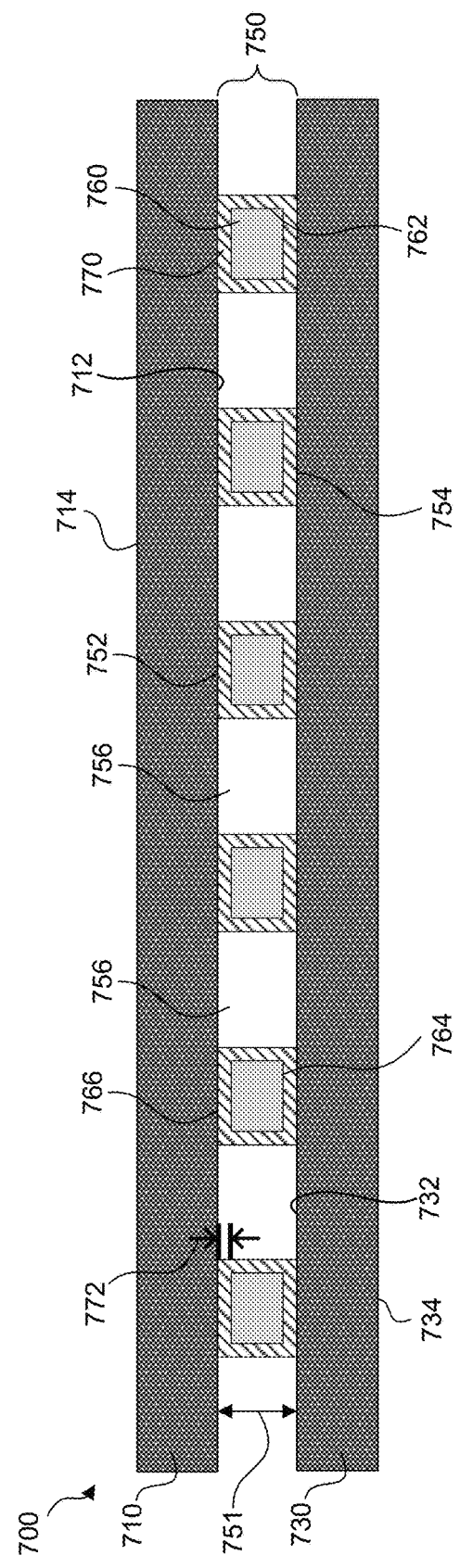

FIG. 7B shows a cross-sectional view of a multilayer fabric 700 according to an embodiment. Multilayer fabric 700 may include a first textile layer 710, a second textile layer 730, and a microporous water vapor permeable layer 750 disposed between and coupled to first textile layer 710 and second textile layer 730. Microporous water vapor permeable layer 750 includes a microporous membrane 760 coated with a metallic coating 770. In some embodiments, the microporous membrane 760 may be composed of a polymeric material, such as but not limited to porous polyethylene (PE), porous polypropylene (PP), porous polyvinylidene fluoride (PVDF), and porous expanded polytetrafluoroethylene (ePTFE). In some embodiments, metallic coating 770 may be composed of a material as, but not limited to, aluminum, titanium, silver, copper, gold, zinc, cobalt, nickel, platinum, and any combination or alloy thereof.

In embodiments including microporous water vapor permeable layer 750, metallic coating 770 may define a first exterior surface 752 and/or second exterior surface 754 of microporous water vapor permeable layer 750. Similar to microporous water vapor permeable layer 720, microporous water vapor permeable layer 750 may be disposed on and/or in contact with first textile layer 710 or second textile layer 730. As shown in FIG. 7B, microporous water vapor permeable layer 750 has a thickness 751 extending from first exterior surface 752 to second exterior surface 754. Thickness 751 may be in the range of 1 micron to 1 mm.

Metallic coating 770 may coat all of or only a portion of the exterior walls of microporous membrane 760. For example, in some embodiments, metallic coating 770 may coat the side walls 762, the bottom wall 764, and the top wall 766 of microporous membrane 760. As another example, metallic coating 770 may coat only top wall 766 of microporous membrane 760. Metallic coating 770 may be deposited on all or a portion of microporous membrane 760 using a process, such as but not limited to, chemical vapor deposition, physical vapor deposition, electrochemical deposition, dip coating, spray coating, lamination, or screen printing. Metallic coating 770 has thickness 772 of at least 3 atoms thick. In some embodiments, thickness 772 may be in the range of 7.5 angstroms to 10 microns. In some embodiments, thickness 772 may be in the range of 1 nm to 1 micron. In some embodiments, thickness 772 may be 10 nm or less.

As shown in FIG. 7B, microporous water vapor preamble layer includes pores 756 having a pore diameter 758. The pore diameter 758 and distribution of pores 756 may the same as or similar to the pore diameter 728 and distribution of pores 726.

Figure 8:
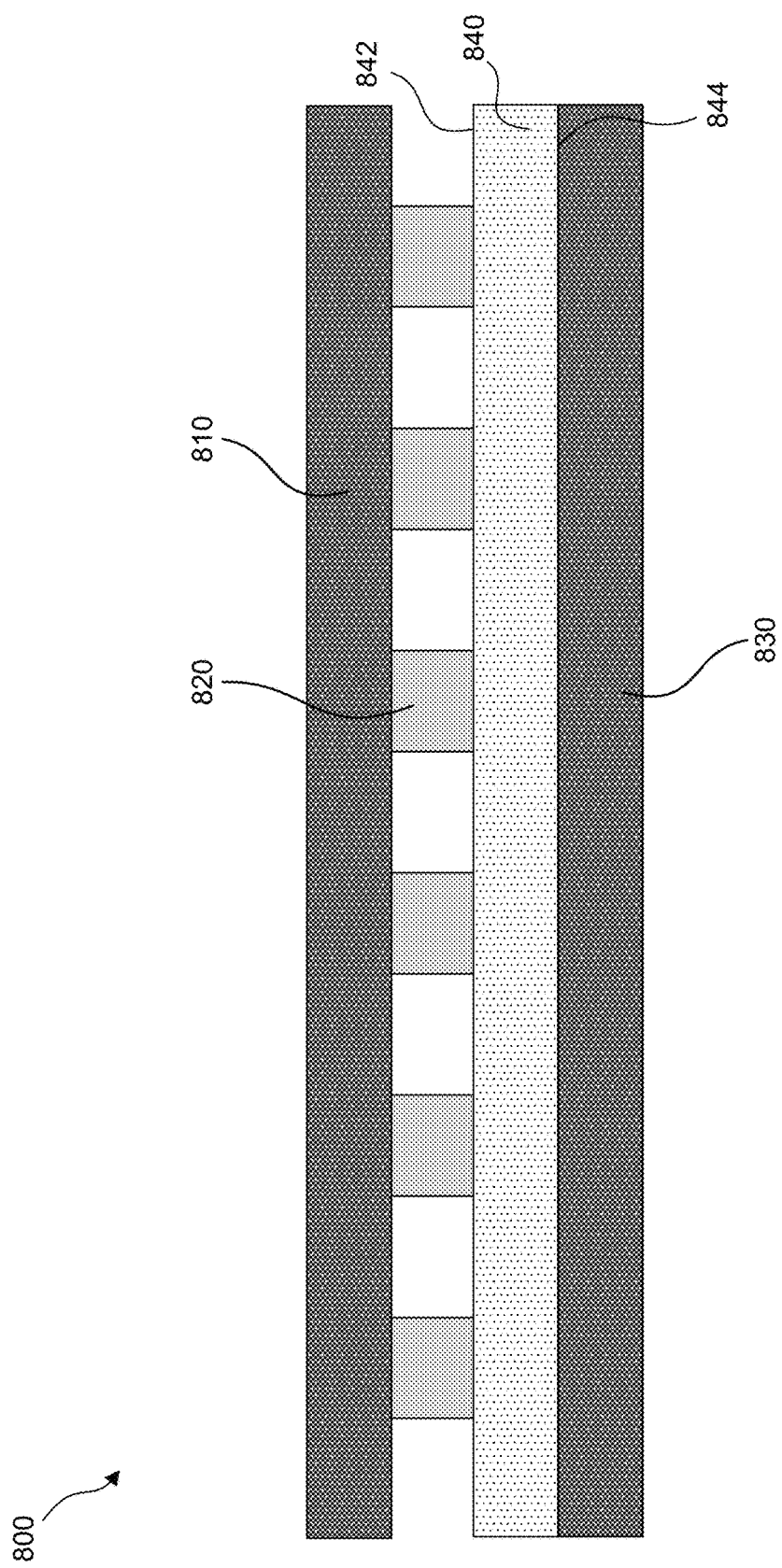
FIG. 8 shows a cross-sectional view of a multilayer fabric according to an embodiment.

FIG. 8 shows a cross-sectional view of a multilayer fabric 800 according to an embodiment. Multilayer fabric 800 may include a first textile layer 810, a second textile layer 830. Multilayer fabric 800 may also include a microporous water vapor permeable layer 820 and a substrate layer 840 disposed between and coupled to first textile layer 810 and second textile layer 830. First textile layer 810 and second textile layer 830 may be the same as or similar to first textile layer 610 and second textile layer 630, respectively. Microporous water vapor permeable layer 820 may be the same as or similar to microporous water vapor permeable layer 720 or 750 discussed above in regards to FIGS. 7A-B.

As shown in FIG. 8, microporous water vapor permeable layer 820 may be coupled to a substrate layer 840. In some embodiments, microporous water vapor permeable layer 820 may be disposed on substrate layer 840. In some embodiments, microporous water vapor permeable layer 820 may be deposited on substrate layer 840. Substrate layer 840 may be a mesh/porous layer composed of a material including, but not limited to, organic and inorganic polymers. In some embodiments, a polymer substrate may be extruded and formed into a mesh/porous layer to create the appropriate pore dimensions. In some embodiments, substrate layer 840 is a textile layer, which may be the same as or similar to first textile layer 810 or second textile layer 830.

Substrate layer 840 may serve to provide an optimal attachment surface for microporous water vapor permeable layer 820. For example, either a first exterior surface 842 or a second exterior surface 844 of substrate layer 840 may provide an optimal surface for depositing, laminating, adhesively bonding, or heat bonding microporous water vapor permeable layer 820. In some embodiments, first exterior surface 842 or second exterior surface 844 may be surface treated (e.g., via etching or coating) to provide an optimal attachment surface for water vapor permeable layer 820. In some embodiments, the inherent properties of the material(s) used to make substrate layer 840 may provide an optimal attachment surface for water vapor permeable layer 820. Also, substrate layer 840 may protect microporous water vapor permeable layer 820 from damage. In some embodiments, multilayer fabric 800 may include more than one substrate layer 840. For example, multilayer fabric 800 may include two substrate layers 840, one on each side of microporous water vapor permeable layer 820.

FIGS. 9A and 9B show embodiments of a multilayer fabric 900 including a nanostructured layer 920. Multilayer fabric 900 may include a first textile layer 910, a second textile layer 930, and a nanostructured layer 920 disposed between and coupled to first textile layer 910 and second textile layer 930. First textile layer 910 and second textile layer 930 may be the same as or similar to first textile layer 610 and second textile layer 630, respectively.

Nanostructured layer 920 may include nanosized features with an arrangement/distribution of nanosized features configured to transmit or reflect a predefined set of wavelengths in the FIR and solar radiation spectrums. In other words, nanostructured layer 920 may be a selective radiation filter configured to transmit or reflect a predefined set of wavelengths in the FIR and solar radiation spectrums. The nanosized features and/or an arrangement/distribution of nanosized features and the predefined set of wavelengths in the FIR and solar radiation spectrums may be selected as discussed herein. Preferably, nanostructured layer 920 is water vapor permeable.

In some embodiments, nanostructured layer 920 may include a layer doped with nanoparticles. In some embodiments, nanostructured layer 920 may include a porous membrane coated or doped with nanoparticles. The nanoparticles may be made of a metallic material, such as but not limited, aluminum, titanium, silver, copper, gold, zinc, cobalt, nickel, platinum, and any combination or alloy thereof. In some embodiments, the nanoparticles may be made of a metal oxide, such as, but not limited to, a metal oxide of any of the above metallic materials. The porous membrane may be composed of a polymeric material, such as but not limited to porous polyethylene (PE), porous polypropylene (PP), porous polyvinylidene fluoride (PVDF), and porous expanded polytetrafluorethylene (ePTFE). In some embodiments, the porous membrane may be composed of a metal or metal oxide, including, but not limited to, aluminum, copper, aluminum oxide, silicon oxide, and carbon based structures (e.g., grapheme arrays).

In some embodiments, nanostructured layer 920 may include a layer having nanosized surface features. In some embodiments, the nanosized surface features may include nanorods, nanoridges or nanogrooves. The nanoszied surface features may be periodic nano-structures that selectively trap (absorb) or reflect specific wavelengths. The nanosized surface features may be produced by one or more of the following processes: etching, chemical vapor deposition, and physical vapor deposition.

In some embodiments, as shown in FIG. 9B, multilayer fabric may include a microporous water vapor permeable layer 940 and a nanostructured layer 920. Microporous water vapor permeable layer 940 may be the same as or similar to microporous water vapor permeable layer 720 or 750 discussed above in regards to FIGS. 7A-B. In embodiments including both, microporous water vapor permeable layer 940 and nanostructured layer 920 may work in concert to selectively filter desired wavelengths. For example, microporous water vapor permeable layer 940 may be configured to selectively filter radiation in the FIR spectrum while nanostructured layer 920 may be configured to selectively filter solar radiation (e.g., block solar radiation). Blocking solar radiation may prevent/reduce the human body's exposure to solar radiation (i.e., increase the value of R by decreasing the value of Ra (Ra is a negative value in Equation 1 because it is heat generated by the environment)). This may help keep an individual cool while participating in warm weather outdoor activities.

Figure 10B:
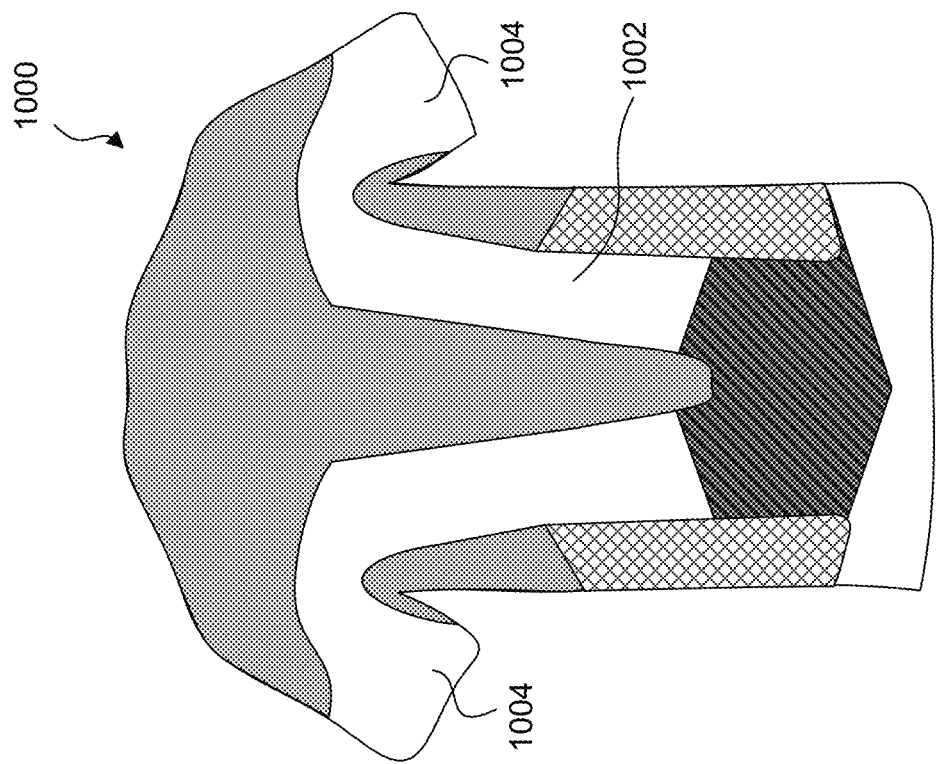
FIGS. 10A and 10B show an article of apparel according to an embodiment.
Figure 10A:
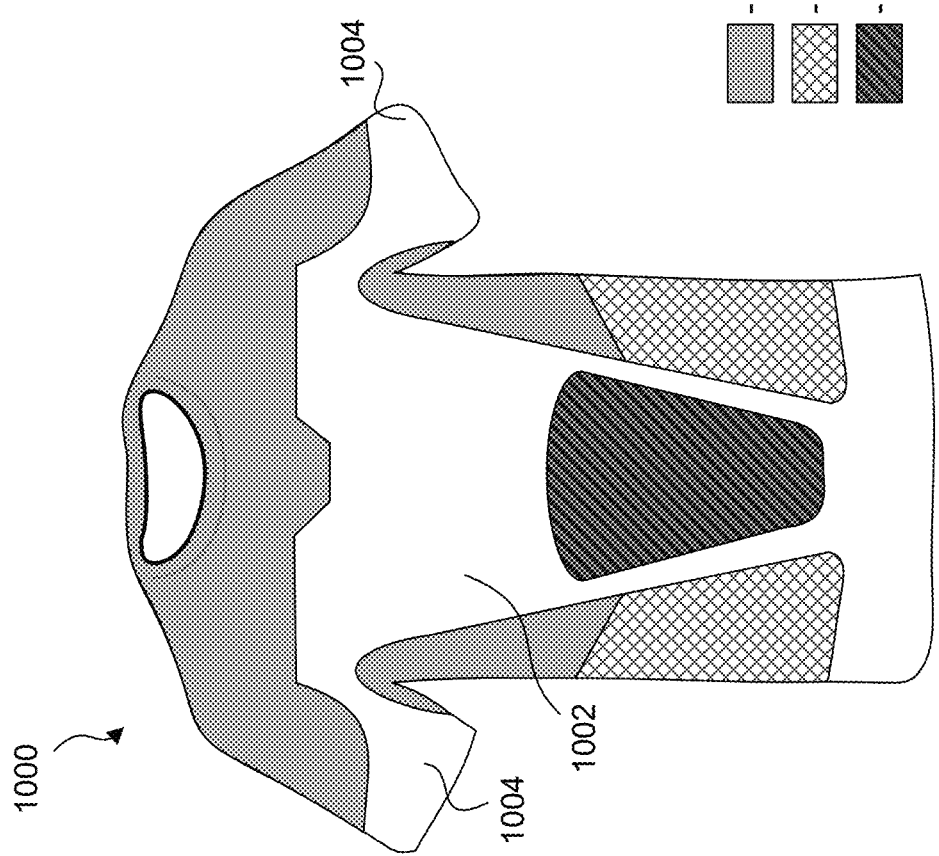

FIGS. 10A and 10B show the front (FIG. 10A) and back (FIG. 10B) of an article of apparel (shirt 1000) according to an embodiment. Shirt 1000 includes a body 1002 and sleeves 1004. In some embodiments, the entire shirt 1000 may be manufactured using one or more of the multilayer fabrics discussed herein (e.g., fabrics 600, 700, 800, 900). In some embodiments, a portion of shirt 1000, for example body 1002, may be manufactured using one or more of the multilayer fabrics discussed herein. Different zones (e.g., zones 1010, 1012, and 1014) located on shirt 1000 may be manufactured using different multilayer fabrics. Accordingly, different zones may be configured to selectively filter different wavelengths and/or different amounts of one or more wavelengths. Different zones may be created by varying the structure of one or more meta-materials (e.g., by varying the porosity of a microporous layer), by overlapping one or more meta-material layers, and/or by using different meta-materials in each zone. The number and configuration of zones on shirt 1000 may be determined by studying different physiological processes of the human body as discussed in U.S. patent application Ser. No. 12/926,051, filed on Oct. 22, 2010, now U.S. Pat. No. 8,910,313, the disclosure of which is incorporated by reference herein in its entirety.

As a non-limiting example, shirt 1000 may include at least a first zone 1010, a second zone 1012, and a third zone 1014 as shown in FIGS. 10A and 10B. First zone 1010, second zone 1012, and third zone 1014 may include a different meta-material layer and/or meta-material layer configuration (e.g., microporous water vapor permeable layers having different porosities) configured to selectively filter specific wavelengths or a range of wavelengths. As a non-limiting example, first zone 1010, which is located on the shoulders of an individual, may include a meta-material layer configured to block a large amount of solar radiation because a large amount of solar radiation tends to hit the shoulders of an individual participating in outdoor activities. Accordingly, blocking solar radiation in first zone 1010 may help keep an individual cool. The number, location, and configuration of zones may be dependent on one or more of the following: the gender for which shirt 1000 is designed, whether shirt 1000 is a warm weather shirt or a cold weather shirt, and whether shirt 1000 is intended to be used indoors or outdoors.

In some embodiments, each zone may include a separate and distinct meta-material layer or set of meta-material layers. In some embodiments, each zone may be formed by varying the configuration (e.g., porosity or particle distribution) of a single meta-material layer at a desired location on an article of appeal (e.g., zone 1010 that covers the shoulder of an individual). In some embodiments, one or more zones of an article of apparel may be devoid of a meta-material layer.

While FIGS. 10A and 10B shows shirt 1000 as an exemplary article of apparel, any article of apparel, or a portion thereof, may be manufactured using the multilayer fabrics discussed herein. Such articles of apparel may be, but are not limited to, pants, shorts, leggings, a sock a jacket, a coat, a hat, a sleeve, a shoe, a sweater, a jersey, and a glove.

In some embodiments, one or more surfaces of one or more of the layers discussed herein (e.g., textile layers, microporous layers, substrate layers, and nanostructured layers) may be coated with a superhydrophillic nanostructured coating. Such a superhydrophillic nanostructured coating may facilitate the wicking and evaporation of sweat. In some embodiments, a superhydrophillic nanostructured coating may comprise titanium dioxide.

Some embodiments may include a multilayer fabric including a microporous water vapor permeable layer configured to allow the transmission of far infrared (FIR) radiation and solar radiation and a first textile layer coupled to the microporous water vapor permeable layer.

In any of the various embodiments discussed herein, the multilayer fabric may include a microporous water vapor permeable layer comprising a metallic material. In any of the various embodiments discussed herein, the multilayer fabric may include a microporous water vapor permeable layer consisting of a metallic material.

In any of the various embodiments discussed herein, the multilayer fabric may include a microporous water vapor permeable layer comprising a microporous membrane coated with a metallic material. In any of the various embodiments discussed herein, the multilayer fabric may include a microporous water vapor permeable layer consisting of a microporous metallic layer.

In any of the various embodiments discussed herein, the multilayer fabric may include a second textile layer. In any of the various embodiments discussed herein, the multilayer fabric may include a microporous water vapor permeable layer disposed between a first textile layer and a second textile layer.

In any of the various embodiments discussed herein, the multilayer fabric may include a microporous water vapor permeable layer comprising open micropores extending through microporous water vapor permeable layer.

In any of the various embodiments discussed herein, the multilayer fabric may include a nanostructured layer. In any of the various embodiments discussed herein, the multilayer fabric may include a nanostructured layer comprising a porous membrane coated or doped with nanoparticles. In any of the various embodiments discussed herein, the multilayer fabric may include a nanostructured layer comprising a layer doped with nanoparticles. In any of the various embodiments discussed herein, the multilayer fabric may include a nanostructured layer comprising a layer having nanosized surface features.

In any of the various embodiments discussed herein, the multilayer fabric may include a microporous water vapor permeable layer comprising a porous layer having a plurality of pores with deviation in pore size no greater than +/−1.0 microns.

In any of the various embodiments discussed herein, the multilayer fabric may include a microporous water vapor permeable layer that is a selective radiation filter configured to transmit a predefined set of wavelengths in the FIR and solar radiation spectrums. In any of the various embodiments discussed herein, the multilayer fabric may include a nanostructured layer that is a selective radiation filter configured to transmit a predefined set of wavelengths in the FIR and solar radiation spectrums.

In any of the various embodiments discussed herein, the multilayer fabric may comprise a substrate layer. In any of the various embodiments discussed herein, a microporous water vapor permeable layer may be disposed on a substrate layer.

In any of the various embodiments discussed herein, the multilayer fabric may include a microporous water vapor permeable layer that is configured to allow the transmission of no more than 10% of FIR radiation. In any of the various embodiments discussed herein, the multilayer fabric may include a microporous water vapor permeable layer that is configured to allow the transmission of no more than 5% of FIR radiation. In any of the various embodiments discussed herein, the multilayer fabric may include a microporous water vapor permeable layer that is configured to allow the transmission of no more than 1% of FIR radiation. In any of the various embodiments discussed herein, the multilayer fabric may include a microporous water vapor permeable layer that is configured to allow the transmission of no more than 10% of FIR radiation having a wavelength in the range of 8 microns to 12 microns.

In any of the various embodiments discussed herein, the multilayer fabric may include a microporous water vapor permeable layer that is a porous layer having a pore size in the range of 1.0 micron to 14.0 microns. In any of the various embodiments discussed herein, the multilayer fabric may include a microporous water vapor permeable layer that is a porous layer having a pore size in the range of 2.0 microns to 14.0 microns. In any of the various embodiments discussed herein, the multilayer fabric may include a microporous water vapor permeable layer is a porous layer having a pore size in the range of 2.0 microns to 8.0 microns. In any of the various embodiments discussed herein, the multilayer fabric may include a microporous water vapor permeable layer that is a porous layer having a pore size in the range of 1.0 micron to 2.0 microns. In any of the various embodiments discussed herein, the multilayer fabric may include a microporous water vapor permeable layer that is a porous layer having a pore size in the range of 9.0 microns to 14.0 microns.

In any of the various embodiments discussed herein, the multilayer fabric may include a microporous water vapor permeable layer that is configured to allow the transmission of no less than 90% of solar radiation. In any of the various embodiments discussed herein, the multilayer fabric may include a microporous water vapor permeable layer is configured to allow the transmission of no less than 95% of solar radiation.

In any of the various embodiments discussed herein, the multilayer fabric may include a microporous water vapor permeable layer comprising a porous layer having an average pore size in the rage of 2.0 microns to 8.0 microns, where the porous layer has a deviation in pore size no greater than +/−1.0 microns. In any of the various embodiments discussed herein, the multilayer fabric may include a microporous water vapor permeable layer comprising a porous layer having an average pore size in the rage of 9.0 microns to 14.0 microns, where the porous layer has a deviation in pore size no greater than +/−1.0 microns. In any of the various embodiments discussed herein, the multilayer fabric may include a microporous water vapor permeable layer comprising a porous layer having an average pore size in the rage of 1.0 microns to 2.0 microns, where the porous layer has a deviation in pore size no greater than +/−0.5 microns.

In any of the various embodiments discussed herein, the multilayer fabric may include a microporous water vapor permeable layer that is configured to allow the transmission of 100% of FIR radiation.

In any of the various embodiments discussed herein, the multilayer fabric may include a microporous water vapor permeable layer that is a porous layer having a pore size greater than 14.0 microns.

In any of the various embodiments discussed herein, the multilayer fabric may include a nanostructured layer that is configured to block solar radiation.

In any of the various embodiments discussed herein, the multilayer fabric may include at least one layer that is coated with a superhydrophillic nanostructured coating.

In any of the various embodiments discussed herein, the multilayer fabric may include a microporous water vapor permeable layer comprising a porous layer having an average pore size greater than 14.0 microns, where the porous layer has a deviation in pore size no greater than +/−1.0 microns Some embodiments may include a multilayer fabric having a microporous water vapor permeable layer with a pore size in the range between 1.0 microns and 14.0 microns, the microporous water vapor permeable layer being configured to allow the transmission of far infrared (FIR) radiation and solar radiation, and a first textile layer coupled to the microporous water vapor permeable layer.

Some embodiments may include a multilayer fabric having a microporous water vapor permeable layer with a pore size greater than or equal to 14.0 microns, the microporous water vapor permeable layer being configured to allow the transmission of far infrared (FIR) radiation and solar radiation, and a textile layer coupled to the microporous water vapor permeable layer.

In any of the various embodiments discussed herein, the multilayer fabric may include a nanostructured layer configured to block solar radiation.

Some embodiments may include an article of apparel with a multilayer fabric having a microporous water vapor permeable layer that is configured to allow the transmission of far infrared (FIR) radiation and solar radiation and a textile layer coupled to the microporous water vapor permeable layer.

In any of the various embodiments discussed herein, the article of apparel may be selected from the group consisting of: a shirt, pants, shorts, leggings, a sock, a jacket, a coat, a hat, a sleeve, a shoe, a sweater, a jersey, and a glove.

In any of the various embodiments discussed herein, the article of apparel may include a microporous water vapor permeable layer is a porous layer having a pore size in the range of 1.0 microns to 14.0 microns. In any of the various embodiments discussed herein, the article of apparel may include a microporous water vapor permeable layer is a porous layer having a pore size in the range of 9.0 microns to 14.0 microns. In any of the various embodiments discussed herein, the article of apparel may include a microporous water vapor permeable layer that is a porous layer having a pore size greater than 14.0 microns.

Some embodiments may include a method of making a fabric including depositing a microporous water vapor permeable layer that is configured to allow the transmission of far infrared (FIR) radiation and solar radiation on a substrate layer and disposing a first textile layer over the microporous water vapor permeable layer.

In any of the various embodiments discussed herein, the method may include depositing a microporous water vapor permeable layer that comprises a metallic layer. In any of the various embodiments discussed herein, the method may include depositing a microporous water vapor permeable layer using a process selected from the group consisting of: vapor deposition, electrochemical deposition, and laser perforation.

In any of the various embodiments discussed herein, the method may include a substrate layer that comprises a second textile layer.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:
1. A multilayer fabric, comprising:
   a microporous water vapor permeable layer comprising:
      a microporous membrane coated with a metallic layer, the metallic layer comprising a metallic material and a thickness of 10 nanometers or less, and
      pores with a pore size in a range of 1.0 micron to 14.0 microns, wherein the pores allow the transmission of far infrared (FIR) radiation and solar radiation, and wherein the pores are arranged in a repeated and consistent pattern;
a first textile layer coupled to the microporous water vapor permeable layer; and
a second textile layer coupled to the microporous water vapor permeable layer,
wherein the microporous water vapor permeable layer is disposed between the first textile layer and the second textile layer.

2. The multilayer fabric of claim 1, wherein the microporous water vapor permeable layer is configured to allow the transmission of no less than 90% of solar radiation.

3. The multilayer fabric of claim 1, wherein the microporous water vapor permeable layer is configured to allow the transmission of no more than 10% of FIR radiation.

4. The multilayer fabric of claim 1, wherein the microporous water vapor permeable layer is configured to allow the transmission of no more than 10% of FIR radiation having a wavelength in the range of 8 microns to 12 microns.

5. The multilayer fabric of claim 1, wherein the microporous water vapor permeable layer comprises a pore density of at least 5,000 pores per $mm^2$.

6. The multilayer fabric of claim 1, wherein a deviation of the pore size of the pores in the microporous water vapor permeable layer is +/−1.0 microns or less.

7. The multilayer fabric of claim 1, wherein the metallic layer comprises a thickness in a range of 7.5 angstroms to 10 nanometers.

8. The multiplayer fabric of claim 1, wherein the microporous membrane comprises a polymeric material.

* * * * *

UNITED STATES PATENT AND TRADEMARK OFFICE
CERTIFICATE OF CORRECTION

PATENT NO. : 11,484,075 B2
APPLICATION NO. : 16/895384
DATED : November 1, 2022
INVENTOR(S) : Coza et al.

It is certified that error appears in the above-identified patent and that said Letters Patent is hereby corrected as shown below:

In the Claims

Column 21, Claim 8, Line 30, replace "multiplayer" with --multilayer--.

Signed and Sealed this
Fourteenth Day of February, 2023

Katherine Kelly Vidal
*Director of the United States Patent and Trademark Office*